United States Patent [19]

Menzner et al.

[11] 4,001,075
[45] Jan. 4, 1977

[54] SEAL FOR PACKAGES CAPABLE OF THERMOPLASTIC SEALING AND MEANS FOR EFFECTING SUCH SEALING

[75] Inventors: Donald F. Menzner; Robert L. Knauf, both of Marathon, Wis.

[73] Assignee: Marathon Cheese Corporation, Marathon, Wis.

[22] Filed: Nov. 20, 1974

[21] Appl. No.: 525,577

[52] U.S. Cl. .................................. 156/581; 156/583
[51] Int. Cl.² .................. B32B 31/00; B30B 15/34
[58] Field of Search ............. 156/581, 583; 53/373, 53/375; 93/DIG. 1

[56] References Cited
UNITED STATES PATENTS

| | | | |
|---|---|---|---|
| 2,441,817 | 5/1948 | Huff | 156/583 |
| 2,496,609 | 2/1950 | Antwerpen | 156/581 |
| 2,589,756 | 3/1952 | Waters | 156/581 |
| 2,610,137 | 9/1952 | Williamson et al. | 156/581 |
| 3,322,603 | 5/1967 | Grasso | 156/583 |
| 3,478,485 | 11/1969 | Hechenlettner | 156/583 |

*Primary Examiner*—Douglas J. Drummond
*Attorney, Agent, or Firm*—Fitch, Even, Tabin & Luedeka

[57] ABSTRACT

A seal for packages formed from materials having thermoplastic surfaces and means for providing such seal. The seal being substantially perfect and the means providing such seal consistently.

4 Claims, 4 Drawing Figures

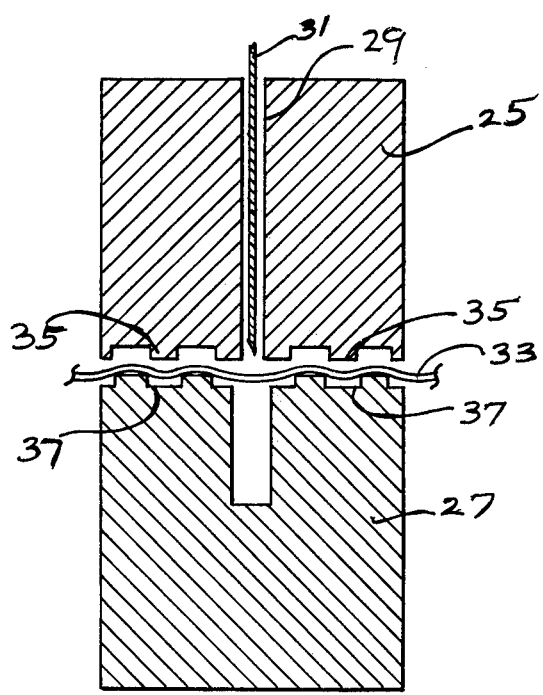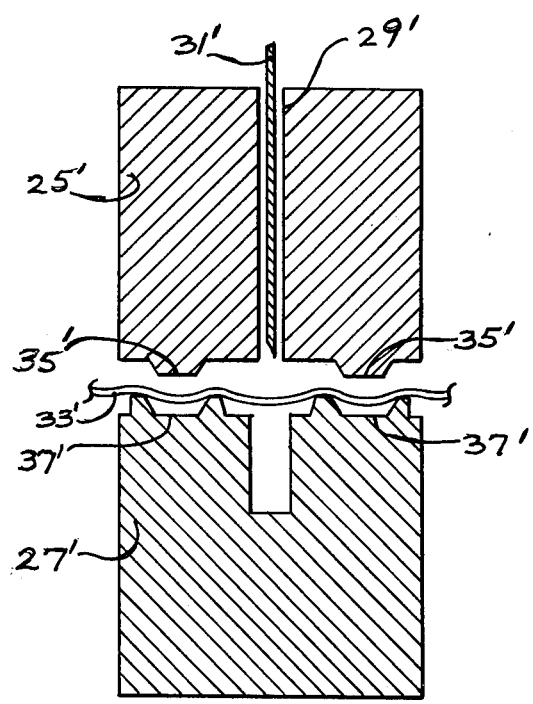

SEAL FOR PACKAGES CAPABLE OF THERMOPLASTIC SEALING AND MEANS FOR EFFECTING SUCH SEALING

The present invention relates generally to a seal for packages capable of thermoplastic sealing and to a means for effecting such sealing.

The sealing of packages comprising thermoplastic materials is a well known and commercial practice. Many machines and various apparatus are available for accomplishing such sealing. However, the provision of perfect seals has been difficult and the achievement of such seals is particularly important in the packaging of various products and especially those products which are subject to spoilage and which are packaged in gaseous atmospheres. In this connection, well known machines for packaging cheese and other food products are the Hayssen RT machines which utilize roll stock plastic materials having thermo plastic surfaces and which wrap and seal the products in a preservative gaseous atmosphere. However, such machines provide packages which do not consistently have perfect seals and therefore provide packages which are considered to be "leakers." Such leakers reduce shelf life of the products and accelerate deterioration of the products. It is costly for the processors and/or packagers to pick-up such products, as well as being costly to the customer or consumer. Obviously it would be to the advantage of the public generally to be able to provide packages with perfect seals.

The provision of seals involves providing adequate heat for sufficient time under pressure while, at the same time, avoiding burning of the packaging material. The provision of such heat is desirably accomplished at as low a temperature as possible. Such heat and pressure are normally provided by jaws which press against one another in generally face to face relation and such means have resulted in seals which provide undesired numbers of leakers.

A principal object of this invention is the provision of an improved seal for packages having thermoplastic surfaces and improved means for accomplishing such a seal.

A further object of the invention is the consistent provision of perfect seals in packages having thermoplastic surfaces wherein the packaging material is uniformly stretched and sealed under heat and pressure.

A still further object of the invention is the provision of improved apparatus consistently providing perfect seals to packages having thermoplastic surfaces, which apparatus has improved operating characteristics.

Additional objects and advantages of the invention will become apparent by reference to the accompanying drawings and following description.

In the drawings:

FIG. 3 is an end view of one form of the jaws; and

FIG. 4 is also an end view but illustrates another form of the jaws.

Figure 1:
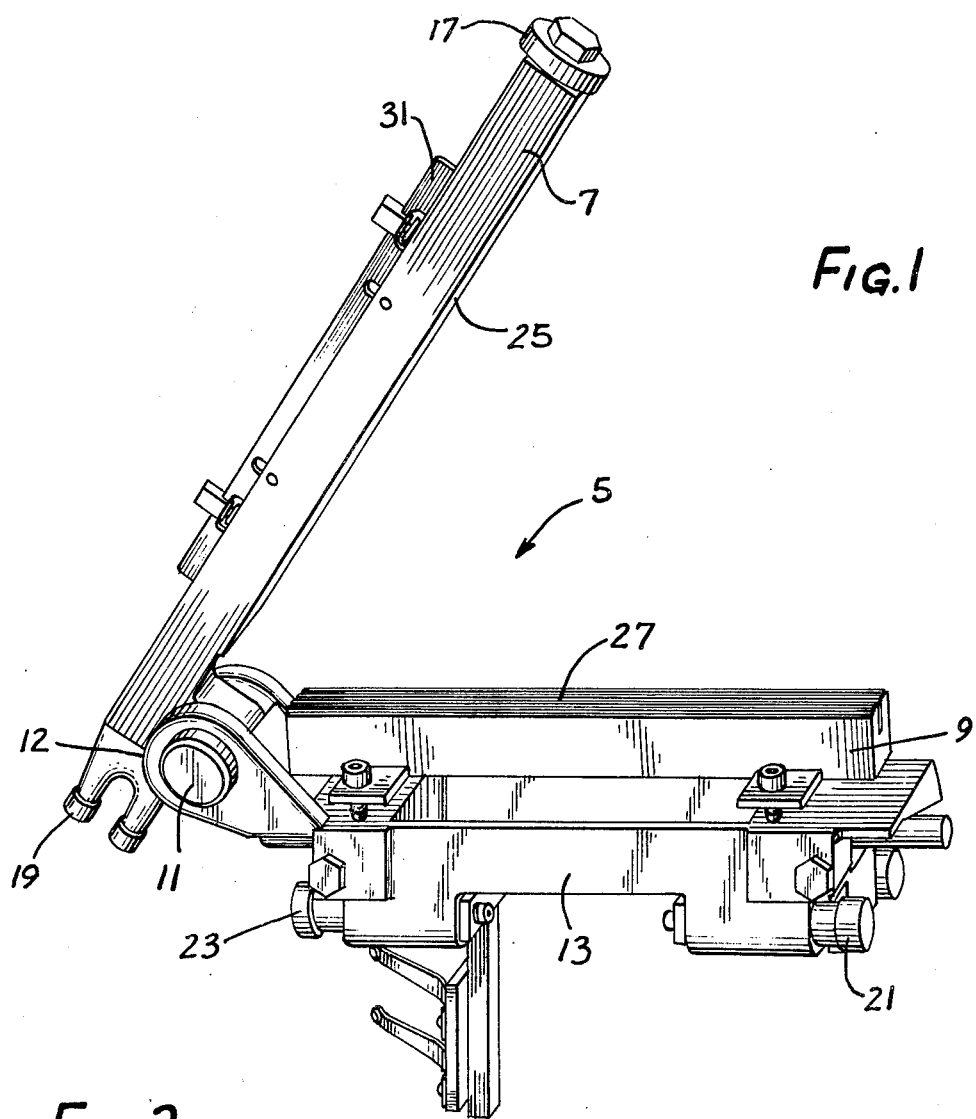
FIG. 1 is a side view of a sealer including jaws of the invention with the jaws being open.
Figure 2:
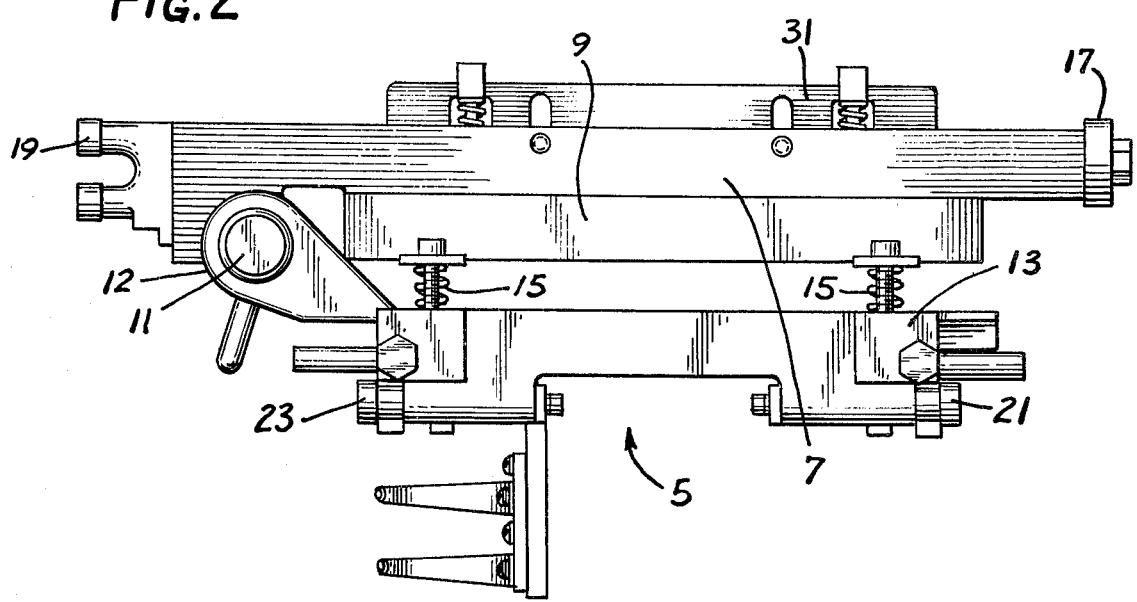
FIG. 2 is a side view of the sealer shown in FIG. 1, the jaws being closed.

The present invention is directed to a Sealer 5 which is incorporated into a machine (not shown) for forming and sealing packages made from materials having thermoplastic surfaces. The material may wholly comprise a thermoplastic material or may be a material which has a coating of thermoplastic material. Such materials are widely available and are well known to packagers and others. However, such material must be capable of some stretch without breaking to provide the seal of the invention.

The Sealer 5 generally includes and upper section 7 which is hinged to a lower section 9 by means of a hinge pin 11, thereby providing a hinge 12. The lower section is carried on a base section 13 by means of compression springs 15. There is inherently some play in the hinge 12 permitting some lateral movement between the upper and lower sections 7 and 9. This provides some floating which is important, as will be hereinafter pointed out.

At opposite ends of the upper section 7 of the Sealer 5 are cam followers 17 and 19 which engage cams on the packaging machine (not shown). Similarly, cam followers 21 and 23 are provided at opposite ends of the base section 13 which also engage cams on the packaging machine. The cam followers 17, 19, 21 and 23, upon engagement with the cams cause the upper section 7 and base section 13 to be forced together thereby compressing the springs 15 and urging the lower section 9 against the upper section 7.

The sealer 5 (as shown in FIGS. 3 and 4) further includes an upper jaw 25 or 25' and a lower jaw 27 or 27'. The jaws are heated by resistance elements not shown, which maintain a desired temperature for effecting seals. As shown, the upper jaws 25 and 25' have a longitudinally extending opening 29 and 29' through which extends a knife blade 31 or 31'. A packaging material 33 or 33' lying in face to face relation is placed between the upper jaw 25 or 25' and lower jaw 27 or 27' for effecting sealing and cutting by the knife 31 or 31'.

In order to effect the desired sealing of the invention, the upper jaws 25 and 25' are each provided with longitudinally extending lands 35 and 35'. The lower jaws 27 and 27' are each provided with grooves 37 and 37' for receiving the respective lands 35 and 35'. The lands and grooves are dimensioned to substantially conform to one another so that when the jaws 25 or 25' and 27 or 27' are forced together the packaging material 33 and 33' are stretched while being pressed together and heated to effect sealing. This action is important in achieving the seals of the invention and in consistently perfect seals.

As shown in FIG. 3, additional lands 35 and grooves 37 are provided in the jaws 25 and 27. Such additional lands and grooves are less desired than the construction shown in FIG. 4.

In operation, the upper jaws 25 or 25' and lower jaws 27 or 27' grab the packaging material 33 and stretch the packaging material into the grooves 37 or 37'. After stretching and sealing, the knife 29 or 29' cuts the packaging material to separate the ends of two successive packages. The lands float into the grooves by reason of the play in the hinge 12 and springs 15. The pressure is concentrated upon the lands thereby effectively increasing the pressure applied by the jaws. The hinged action allows the lands to gradually fit into the grooves but it will be understood that the upper jaws 25 and 25' need not be hinged to the lower jaws 27 and 27' so that they can be forced together in substantially parallel relation.

The lands in plant tests can be from about 0.0025 to about 0.035 inches in depth and from about 0.09 to about 0.125 inches in width. The grooves are similarly dimensioned. As shown in FIG. 4, the lands and grooves may have sloping sides and in the illustrated embodiment, the slope is about 60°. Such sloping aides in avoiding undue stretching and breaking of the packaging material.

The seal thus provided has the respective layers stretched in the seal area providing more effective seals. Also, the seals are uneven in cross section and can be said to be corrugated. The resultant seal avoids leakers and consistently provides perfect seals.

The various features of the invention which are believed to be new are set forth in the following claims are:

1. In apparatus for sealing packaging materials having thermoplastic surfaces, a pair of elongated heated jaws which are hingedly connected and at least one of said jaws being mounted on compression springs to float into engagement with one another, one jaw having a longitudinally extending land thereon, the face width of which is greater than its depth, and the other jaw having a longitudinally extending groove therein for receiving said land, said groove having dimensions substantially like the dimensions of the land, said jaws including can means at their opposite ends for forcing said jaws together in substantially parallel relation to stretch, heat, and press together the packaging materials to effect the sealing thereof, such opposite end location of said means on said jaws allowing an unobstructed path of movement of the packaging materials between the jaws in a direction transversely thereof when the jaws are open.

2. A pair of jaws in accord with claim 1 in which the land has a depth between about 0.025 and about 0.035 inches and a width between about 0.09 and about 0.125 inches.

3. A pair of jaws in accord with claim 1 in which the land and groove have sloping side walls.

4. A pair of jaws in accord with claim 3, the slop of the side walls being about 60°.

* * * * *